A. J. MOISANT.
FILTER.
APPLICATION FILED OCT. 27, 1916.

1,270,042.

Patented June 18, 1918.
2 SHEETS—SHEET 1.

Inventor
Alfred J. Moisant
By his Attorneys
Rosenheim, Stockbridge & Bowes

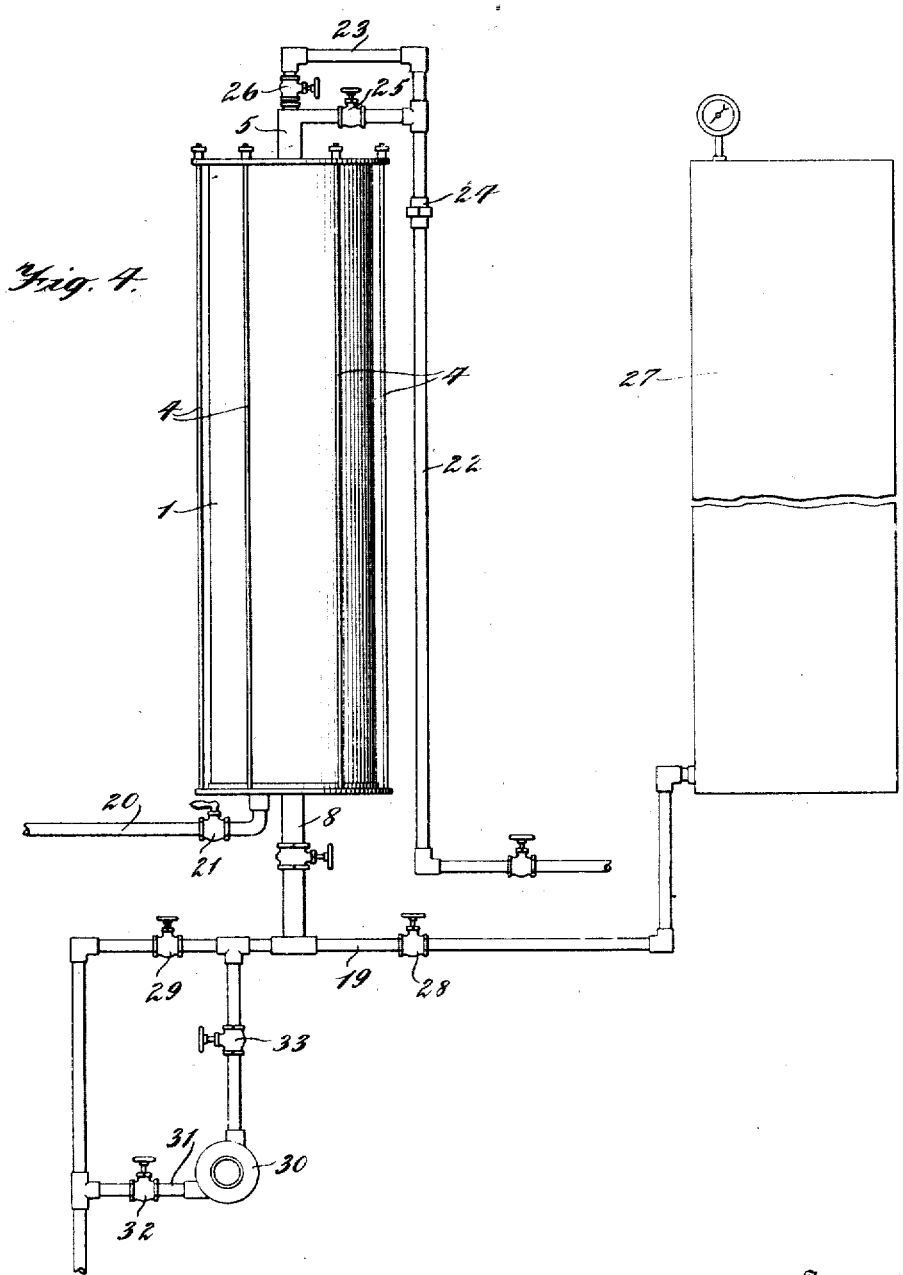

UNITED STATES PATENT OFFICE.

ALFRED J. MOISANT, OF NEW YORK, N. Y., ASSIGNOR, BY MESNE ASSIGNMENTS, TO GENERAL RESEARCH LABORATORIES, A CORPORATION OF NEW YORK.

FILTER.

1,270,042.

Specification of Letters Patent.  Patented June 18, 1918.

Application filed October 27, 1916. Serial No. 127,985.

*To all whom it may concern:*

Be it known that I, ALFRED J. MOISANT, a citizen of the United States, residing at the city of New York, in the borough of Manhattan and State of New York, have invented certain new and useful Improvements in Filters, of which the following is a full, clear, and exact description.

My invention relates to filters and an object of my invention is to provide a construction which will be thoroughly effective and reliable in its operation. Another object is to provide a filter so constructed that it may be easily, quickly and thoroughly cleaned. Other objects are simplicity, strength and durability of construction. Still other objects and advantages of my invention will appear from the following description.

My invention resides in the features of construction and arrangements of parts hereinafter described and pointed out in the appended claims.

Fig. 4 is a diagram of a system embodying my invention.

Figure 1:
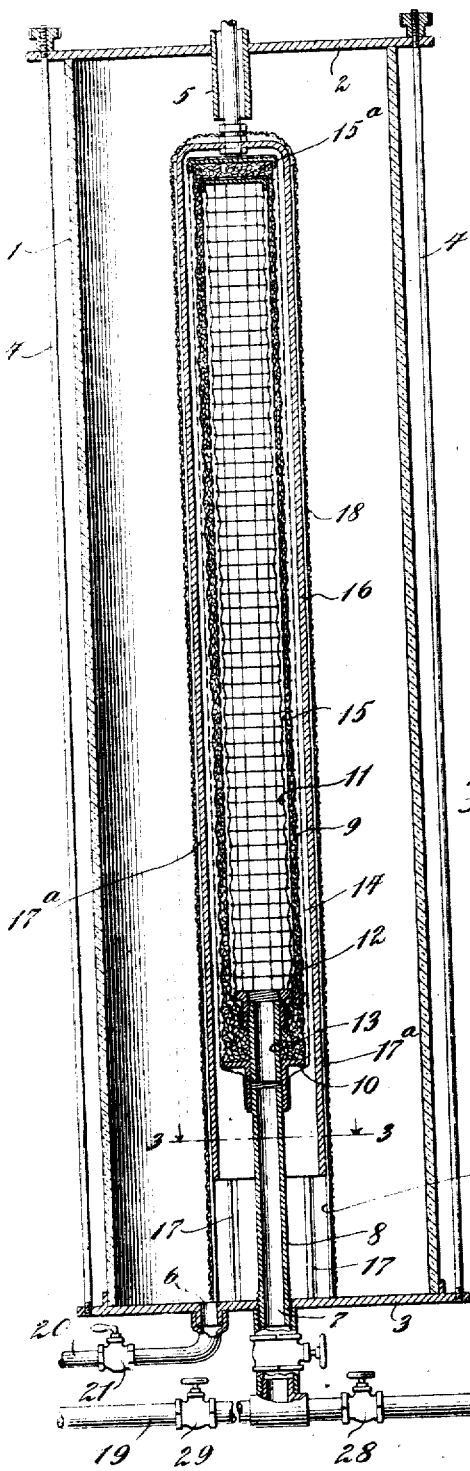
Figure 1 is a central longitudinal section of a filter embodying my invention.
Figure 2:
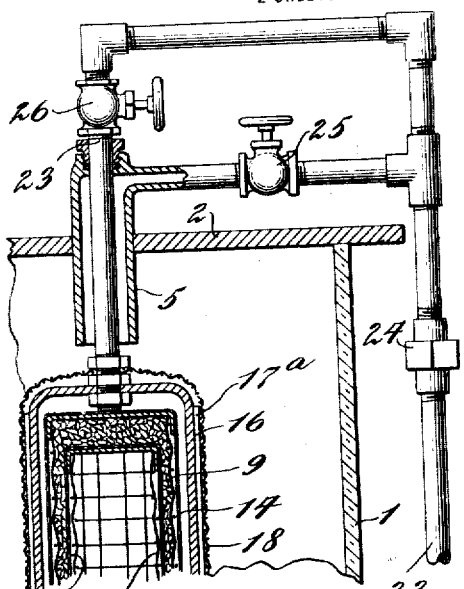
Fig. 2 is an enlarged sectional detail of the structure at the inlet end.
Figure 3:
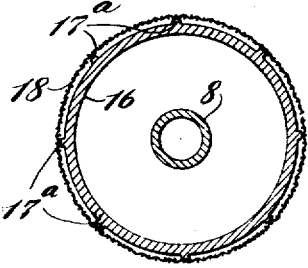
Fig. 3 is an enlarged horizontal section of the interior filtering construction, taken on line 3—3 of Fig. 1.

The casing is shown as cylindrical and composed of a glass cylinder 1 having its ends closed by a top plate 2 and a bottom plate 3 secured together by rods 4. The inlet pipe 5 in the construction shown enters through the top plate.

The bottom plate 3 is provided with a drainage opening 6 and an outlet opening 7. An outlet pipe 8 is secured in the outlet opening and extends upwardly a substantial distance into the casing. Secured to the upper end of this outlet pipe is a filter member consisting in the form shown of two filter bags contained one within the other and having their mouths secured in a liquid tight manner to the pipe 8. As shown, each bag is supported by a cylindrical wire frame, the frame 9 of the outer bag being attached at its lower end to a nut 10 which is screwed on to the top of the outlet pipe 8; and the frame 11 of the inner bag being similarly attached to a nut 12, an externally screw threaded coupling member 13 coupling the two bags and forming a continuation of the outlet pipe 8. The top ends of the two frames are shown as closed by metal plates, and the external and internal filter bags 14 and 15 of suitable fabric are fitted over the frames 9 and 11, respectively. The bags are so proportioned in length as to reach well up to the inner end of the inlet pipe. If desired, a filtering medium 15ª, such as charcoal, may be used in the space between the bags.

Covering these upstanding filter bags is a cylindrical imperforate screen member 16 composed preferably of a suitable light metal. This screen 16 is of somewhat larger diameter than the outer filter bag, thus providing an air space between them, and its upper end is closed and its lower end is open. It is supported by legs 17 with its lower end some distance above the bottom 3 of the casing, but a substantial distance below the upper end of the outlet pipe, the legs 17 being continuations of external longitudinal ribs 17ª on the screen member.

This imperforate screen member 16 may be surrounded by a cylindrical foraminous screen 18 of wire mesh which fits over the member 16, being spaced therefrom by the ribs 17ª. This outer screen 18 rests upon the top of the imperforate screen member 16, and preferably extends down to the bottom of the casing, being of proper diameter to substantially bisect the drain opening 6, whereby a drainage opening is provided for both the space outside and the space inside of the screen 18.

The outlet pipe 8 is shown as leading to a conduit 19, and a drain pipe 20 which includes a valve or cock 21 communicates with the drain opening 6. The inlet pipe 5 is connected to the supply pipe 22 for the material to be filtered. Means are also provided for delivering a cleansing fluid to the top of the space between the outer bag 14 and the imperforate screen 16. In the construction shown, the fluid which is being filtered serves this purpose, a branch of the supply pipe 22 leading to this space. The branch pipe 23 extends concentrically through the inlet pipe 5 and through the top of the screen 16, the inner end being threaded and nuts serving to clamp the screen members 16 and 17 to the branch pipe 23.

The internal filter structure is thereby securely braced. The inlet pipe 5 has an elbow, as shown, and the branch pipe 23 is secured to the inlet pipe where it enters at the elbow. For convenience in assembling the inlet pipe 5 is made to branch off from the branch pipe 23, thus forming a unitary structure which is detachably connected to the supply pipe 22 by a coupling nut 24. Cocks 25 and 26 are provided in the inlet and branch pipes, respectively.

During the filtering operation, the cock 26 is closed and the cock 25 is open. The liquid to be filtered enters through the inlet pipe 5 and runs down over the outside of the imperforate screen member 16, the external screen member 18 serving to screen out the coarser and lighter particles. When the liquid rises to the top of the outlet pipe 8, it filters through the filter bag structure and discharges into the outlet pipe and thus into the conduit 19. Since the liquid must take its course around the bottom of the screen member 16 before it can reach the discharge opening in the outlet pipe, a substantial proportion of the heavier solid particles in the liquid is screened out or separated at this point, and these solid particles settle to the bottom of the casing. As the pores in the filter bag become filled by the solid matter which is filtered out, the liquid will rise in the filter to a higher level, and will thus at all times seek a clean filtering surface.

This construction of filter may be easily and quickly cleaned. To effect this, it is only necessary to reverse the flow of liquid through the filter in the usual way. As the liquid flows outwardly through the filter bags, it washes off the outer filtering surface, and the solid matter thus removed falls to the bottom of the filter. The valve or cock 21 is open and the liquid runs out through the drain pipe 20. Meanwhile the filter may be thoroughly flushed by liquid entering through the inlet pipe 5 and the branch pipe 23. This cleaning operation may be frequently repeated without any material loss in the time of operation of the filter. If desired, the outlet pipe 7 may communicate with a source of fluid under pressure which is employed for cleaning the filter, and my invention comprehends such a system. As illustrated in Fig. 4, for example, gas under pressure may be stored in a tank 27 communicating with the conduit 19, controlling valves 28 and 29 being provided in the conduit 19 on opposite sides of the outlet pipe 8. When it is desired to clean the filter, it is only necessary to close the valve 29 and open the valves 21 and 28. The gas under pressure then enters the filtering bags and serves to effectively remove the cake on the outer side thereof. It will be observed that since the screen member 16 is closed at the top, it serves to trap the air therein, the pressure of which coöperates with the pressure of the gas in cleaning the bag. The liquid entering through the branch pipe 23 also assists in cleaning the surface of the bag.

This system has a special application in performing the process of my co-pending application Serial No. 113,068, filed August 4, 1916, in which is disclosed a process of ozonizing liquids. In this application of my invention, the valves 28 and 29 will both be open in the normal operation and the filtered liquid will enter the stream of ozone under pressure in the conduit 19; while to clean the filter, it is only necessary to close the valve 29 and open the valve 21, thus causing the ozonized atmosphere under pressure to take its course upwardly through the outlet pipe 8 into the filter.

In accordance with my invention, means may also be provided for thoroughly withdrawing all the liquid content from the filter cake on the outside of the bag before removing the cake, this being useful in many industries, such as sugar refining and the cyanid process of mining, for example. For this purpose an exhaust pump 30 is employed in a branch 31 of the conduit 19, which branches off between the valve 29 and the connection with the outlet pipe 8. Valves 32 and 33 control this branch conduit. In carrying out this process of cleaning the filter, therefore, first the cocks 25, 26, 28 and 29 will all be closed and the cocks 32 and 33 opened and the fan or pump 30 operated and air drawn through the conduit 20 and through the filter cake until the filter cake is thoroughly dry, and then the cocks 32 and 33 are closed and the cocks 21 and 28 are opened and the cleaning fluid admitted to the interior of the filter to remove the cake.

It is obvious that various modifications may be made in the construction shown in the drawings and above particularly described within the principle and scope of my invention.

I claim:

1. A filter comprising a casing having an upstanding outlet pipe in the bottom thereof, a filter member secured to the upper end thereof, an imperforate screen member surrounding the filter member and having its lower end disposed below the top of the outlet pipe, and a foraminous screening member surrounding the screen member with an intervening space and extending below the screen member.

2. A filter comprising a casing having an upstanding outlet pipe in the bottom thereof, a filter member secured to the upper end thereof, an imperforate screen member surrounding the filter member provided with longitudinal ribs and having its lower end disposed below the top of the outlet pipe, and a foraminous screening member surrounding the screen member and spaced therefrom by the ribs and extending below the screen member.

3. A filter comprising a casing having an outlet pipe in the bottom extending upwardly into the casing, an upstanding filter bag construction having its mouth secured to the outlet pipe, an imperforate screen member surrounding the filter bag construction with an intervening space and having its upper end closed and its lower end open and disposed below the top of the outlet pipe, a foraminous screening member surrounding the screen member with an intervening space and closed over the top thereof, and an inlet pipe in the top of the casing having its inner end engaging the top of the outer foraminous screening member and bracing the same.

4. A filter comprising a casing having an inlet opening and an outlet opening, an upstanding outlet pipe in the outlet opening including a removable extension, a coupling nut coupling the extension to the pipe, and an upstanding double filter bag construction consisting of an internal bag having its mouth secured to the top of the extension and an external bag having its mouth secured to the coupling nut.

5. A filter comprising a casing having an inlet and an outlet opening therein, an upstanding outlet pipe in the outlet opening, a hollow tubular filter member attached to the upper end of the outlet pipe and extending upwardly therefrom into the casing, an imperforate screen member surrounding the filter member with its lower end below the top of the outlet pipe, and a cleansing-fluid conductor leading to the top of the screen member.

In witness whereof, I subscribe my signature, in the presence of two witnesses.

ALFRED J. MOISANT.

Witnesses:
WALDO M. CHAPIN,
MARY G. HART.